United States Patent
Izquierdo

(10) Patent No.: US 12,389,895 B2
(45) Date of Patent: *Aug. 19, 2025

(54) CONTROL OF NEMATODES

(71) Applicant: BAYER CROPSCIENCE, S.L., Barcelona (ES)

(72) Inventor: Josep Ignasi Izquierdo, Barcelona (ES)

(73) Assignee: BAYER CROPSCIENCE, S.L., Barcelona (ES)

( * ) Notice: Subject to any disclaimer, the term of this patent is extended or adjusted under 35 U.S.C. 154(b) by 1322 days.

This patent is subject to a terminal disclaimer.

(21) Appl. No.: 17/053,606

(22) PCT Filed: May 2, 2019

(86) PCT No.: PCT/EP2019/061251
§ 371 (c)(1),
(2) Date: Nov. 6, 2020

(87) PCT Pub. No.: WO2019/215008
PCT Pub. Date: Nov. 14, 2019

(65) Prior Publication Data
US 2021/0068383 A1    Mar. 11, 2021

(30) Foreign Application Priority Data

May 9, 2018  (EP) ..................... 18171591

(51) Int. Cl.
*A01M 1/02*  (2006.01)
*A01M 17/00*  (2006.01)
(Continued)

(52) U.S. Cl.
CPC ............ *A01M 1/026* (2013.01); *A01M 17/00* (2013.01); *A01N 63/30* (2020.01); *G01K 17/08* (2013.01); *G06N 20/00* (2019.01)

(58) Field of Classification Search
CPC ....... A01M 1/026; A01M 17/00; A01N 63/30; G01K 17/08; G06N 20/00
See application file for complete search history.

(56) References Cited

U.S. PATENT DOCUMENTS

2006/0191023 A1*   8/2006  Gill ................... G01N 33/5085
                                                           800/13
2006/0242900 A1   11/2006  Lovelace
(Continued)

FOREIGN PATENT DOCUMENTS

CN   103340193 A  * 10/2013
CN   102213672 B  * 12/2015
(Continued)

OTHER PUBLICATIONS

Kiewnick, Sebastian, and R. A. Sikora. "Biological control of the root-knot nematode Meloidogyne incognita by Paecilomyces lilacinus strain 251." Biological control 38, No. 2 (2006): 179-187. (Year: 2006).*

(Continued)

*Primary Examiner* — Larry D Riggs, II
*Assistant Examiner* — Ghazal Sabour
(74) *Attorney, Agent, or Firm* — Harness, Dickey & Pierce, P.L.C.

(57) ABSTRACT

The present invention is concerned with the technical field of crop protection. The present invention relates to a system, a method, a kit and a computer program product for controlling nematodes.

18 Claims, 8 Drawing Sheets

Figure 1:
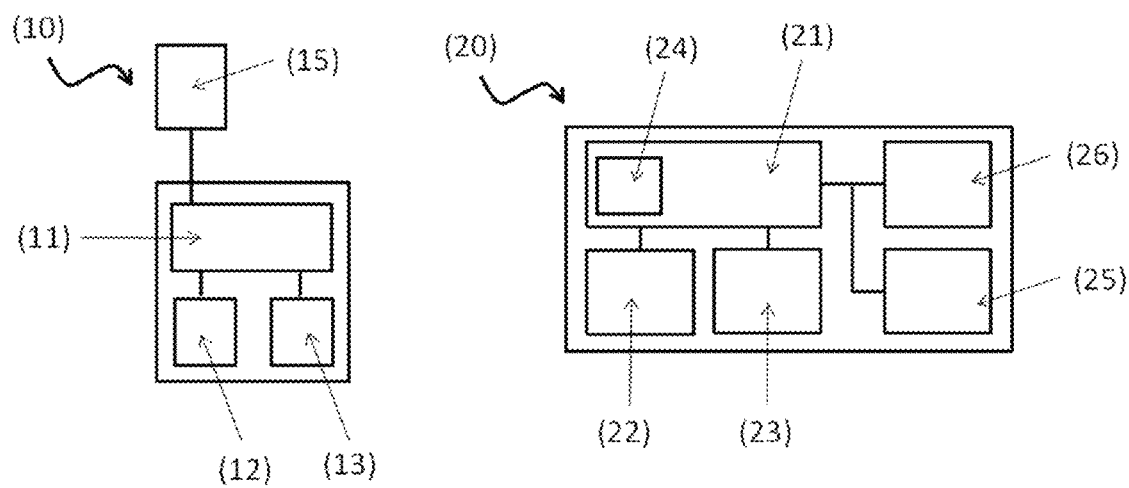

(51) Int. Cl.
  *A01N 63/30* (2020.01)
  *G01K 17/08* (2006.01)
  *G06N 20/00* (2019.01)

(56) References Cited

U.S. PATENT DOCUMENTS

2016/0150744 A1* 6/2016 Lin .................... A01M 7/0089
                                                        43/132.1
2020/0060246 A1* 2/2020 Hopkins ............ G01N 33/5085

FOREIGN PATENT DOCUMENTS

| CN | 106416704 A |   | 2/2017 |              |
|----|-------------|---|--------|--------------|
| CN | 106444581 A | * | 2/2017 | ........... G05B 19/048 |
| KR | 20030051123 A | * | 6/2003 |              |
| WO | WO-2009132425 A1 |   | 11/2009 |          |
| WO | WO-2014039943 A1 |   | 3/2014 |           |

OTHER PUBLICATIONS

Alvear et al. EcoSensor: Monitoring environmental pollution using mobile sensors, Department of Computer Engineering Universitat Politecnica de Val $^{ADDAC;Ago}$encia, IEEE, 2016 (Year: 2016).*

Bonants et al. A basic serine protease from Paecilomyces lilacinus with biological activity against Meloidogyne hapla eggs, Microbiology (1995), 141, 775-784 (Year: 1995).*

Yang et al. Nematicidal enzymes from microorganisms and their applications, Published online: Jul. 6, 2013 # Springer-Verlag Berlin Heidelberg 2013 (Year: 2013).*

Vela María Dolores et al., Thermal time requirements of root-knot nematodes on zucchini-squash and population dynamics with associated yield losses on spring and autumn cropping cycles, *European Journal of Plant Pathology*, Springer Netherlands, NL, vol. 140, No. 3, Jul. 18, 2014 (Jul. 18, 2014), pp. 481-490, DOI:10.1007/s10658-014-0482-X, ISSN: 0929-1873, XP035401149.

Xiumin Yan et al., Daytime warming has stronger negative effects on soil nematodes than night-time warming, *Scientific Reports*, vol. 7, No. 108, Mar. 7, 2017 (Mar. 7, 2017), pp. 1-6, DOI: 10.1038/S41598-017-00218-4, XP002783548.

http://ipm.ucanr.edu/WEATHER/ddconcepts_html, revised Jun. 21, 2016 (Printed Nov. 11, 2020), 5 pages.

Giné, A., López-Gómez, M., Vela, M.D., Ornat, C., Talavera, M., Verdejo-Lucas, S. and Sorribas, F.J. (2014), Thermal requirements and population dynamics of root□knot nematodes on cucumber and yield losses under protected cultivation. Plant Pathol, 63: 1446-1453. <https://doi.org/10.1111/ppa.12217>.

López-Gómez, M., Gine, A., Vela, M., Ornat, C., Sorribas, F., Talavera, M. and Verdejo-Lucas, S. (2014), Damage functions and thermal requirements of *Meloidogyne javanica* and *Meloidogyne incognita* on watermelon. Ann Appl Biol, 165: 466-473. <https://doi.org/10.1111/aab.12154>.

Wang, K. H., & McSorley, R. (2008). Exposure Time to Lethal Temperatures for Meloidogyne incognita Suppression and Its Implication for Soil Solarization. *Journal of nematology*, 40(1), 7-12.

U.S. Appl. No. 17/053,631, filed Nov. 6, 2020, Izquierdo.

Hou Maolin et al., "Influence of film mulch, soil type and organic matter on soil temperature when controlling root-knot nematode by solar heating", Journal of Ecological Agriculture of China, (Sep. 15, 2007) pp. 46-50.

* cited by examiner

CONTROL OF NEMATODES

CROSS-REFERENCE TO RELATED APPLICATIONS

This application is a U.S. national stage filing under 35 U.S.C. § 371 of International Application No. PCT/EP2019/061251, filed on May 2, 2019, which claims the benefit of and priority to European Application No. 18171591.3, filed on May 9, 2018. The entire disclosure of each of the above applications is incorporated herein by reference.

The present invention is concerned with the technical field of crop protection. The present invention relates to a system, a method, a kit and a computer program product for controlling nematodes.

Nematodes belong to the diverse biological class of roundworms. In most cases, they are relatively small, white to colourless thread-like worms. Nematodes occur almost everywhere. They have adapted themselves worldwide to various habitats. They occur both in fresh water and in salt water, in the soil, in plants, in rotting organic substance or as parasites on animals and humans.

Of the about 20 000 known nematode species, approx. 3000 feed on plants. About 100 species are major pests on crop plants. The endoparasitic species harmful to plants are on average 1 mm long. They attack the root system of the host plants and severely impair the metabolism thereof. By means of a mouth stylet, they pierce plant cells, release saliva and thereby induce nutritive cell tissue, from which they take up cell contents for their own nutrition.

The typical life cycle of a nematode may be illustrated on the basis of the beet cyst nematode. The survival organ of the nematode is the cyst. Said cyst is about the size of a pinhead and can contain 200 to 300, in extreme cases over 600, eggs and larvae. Cultivation of crop plants leads to an "activation" of the larvae present in the cyst. Root secretions exert a hatching stimulus on the larvae, with the result that they leave the cyst. With the aid of its mouth stylet, the nematode penetrates into the root system. Said nematode takes hold after a brief migration in the root, induces the formation of the syncytium and passes through further larval stages until it develops into an adult male or female. The white females swell, their rear ends break out of the root, but their heads remain anchored in the nutritive cell system. Mating is done by the free-living males outside the root. Subsequently, on average 250 to 300 eggs mature in each female. The female dies, the lemon-shaped body changes colour from white via light-brown to a dark-brown cyst, which later detaches from the root. In this strong-walled cyst, the eggs and larvae remain viable for 10 years.

The development time of one generation of nematodes is strongly dependent on temperature. For example, the completion of one generation of *Heterodera schachtii* requires a heat sum of 465 degree days (° C.xdays). Said sum can be ascertained by daily measurement of the average soil temperatures at a depth of 10-20 cm and of the values above the base temperature 8° C.

Various chemical substances are used to counteract a nematode attack. However, from an ecological point of view and because of product authorization, there are more and more restrictions opposed to control by chemicals.

As an alternative, biological control methods are used, for example a nematicide based on the mould *Paecilomyces lilacinus*, which preferentially attacks nematode eggs.

For the control of nematodes, it is important to use the particular method as efficiently as possible in order to save costs, to preserve the environment, and/or to secure a high harvest quality.

These objects are achieved by the subjects of the independent claims. Preferred embodiments are found in the dependent claims and in the present description and the drawings.

A first subject of the present invention is a method for controlling nematodes in a soil, comprising the steps of
  (A) installing a temperature sensor in the soil
  (B) providing a model of the temperature-dependent development of nematodes, wherein the model models the complete or partial passage through one or more life cycles of the nematodes,
  (C) measuring temperature values in the soil at measurement time points
  (D) linking the temperature values to the measurement time points
  (E) calculating a heat sum on the basis of the temperature values and the measurement time points with the aid of the model
  (F) comparing the calculated heat sum with a target parameter, wherein the target parameter specifies that heat sum which is necessary to reach a local maximum in the quantity of nematodes in a controllable nematode stage,
  (G) outputting a message in the event that the calculated heat sum reaches the target parameter.

A further subject of the present invention is a system comprising
  a sensor unit having a temperature sensor and a transmitting unit, and
  a computer system having a receiving unit
    wherein the sensor unit is configured to capture temperature values using the temperature sensor at measurement time points,
    wherein the sensor unit is configured to send the temperature values using the transmitting unit,
    wherein the computer system is configured to receive the temperature values using the receiving unit,
    wherein the computer system is configured to calculate a temperature-dependent development parameter on the basis of the received temperature values and the measurement time points with the aid of a model of the temperature-dependent development of nematodes and to compare said development parameter with a target parameter,
    wherein the model models the complete or partial passage through one or more life cycles of the nematodes,
    wherein the temperature-dependent development parameter is a heat sum,
    wherein the target parameter is that heat sum which is necessary to reach a local maximum in the quantity of nematodes that are in a controllable nematode stage,
    wherein the computer system is configured to generate a message when the temperature-dependent development parameter reaches the defined target parameter.

A further subject of the present invention is a computer program product comprising a program code which is stored on a data carrier and which causes a computer system comprising a main memory to execute the following steps when the program code is loaded into the main memory, receiving temperature values which have been captured at measurement time points, calculating a temperature-dependent development parameter on the basis of the received temperature values and the measurement time points with the aid of a model of the temperature-dependent development of nematodes, wherein the model models the complete or partial passage through one or more life cycles of the nematodes, wherein the temperature-dependent development parameter is a heat sum, comparing the calculated temperature-dependent development parameter with a defined target parameter wherein the target parameter is that heat sum which is necessary to reach a local maximum in the quantity of nematodes that are in a controllable nematode stage, generating a message when the temperature-dependent development parameter reaches the defined target parameter.

Further subject matter of the present invention relates to a kit comprising the computer program product according to the invention and a control agent against nematodes in a controllable nematode stage, preferably a nematicide based on the mould *Paecilomyces lilacinus* against nematode eggs, and/or a sensor unit with a temperature sensor and a transmitting unit.

The invention will be more particularly elucidated below without making a distinction between the subjects of the invention (system, method, computer program product). On the contrary, the following elucidations are intended to apply analogously to all the subjects of the invention, irrespective of in which context the elucidations are made.

If, in the present description or in the claims, steps are mentioned in a sequence, this does not necessarily mean that the invention is restricted to the stated sequence. On the contrary, it is conceivable that the steps can be executed in a different sequence as well or in parallel to one another as well; an exception is if one step builds on another step, this making it absolutely necessary for the building step to be executed in a subsequent manner (this, however, being clear in individual cases). The stated sequences are thus preferred embodiments of the present invention.

The present invention provides means for the efficient control of nematodes. In particular, the nematodes are nematodes which appear as pests in horticulture and/or agriculture. The present invention is particularly suitable for controlling *Meloidogyne* spp., *Radopholus similis*, *Globodera* spp. and/or *Pratylenchus* spp.

A major element of the present invention is a temperature sensor. It is used to measure the temperature of a soil at a depth of 10 cm to 20 cm. Nematodes usually dwell in this range.

Preferably, the temperature sensor is a component of a sensor unit which captures temperature values in an automatic manner after start-up and transmits them to a computer system by means of a transmitting unit.

The system according to the invention can comprise one or more temperature sensors. The system according to the invention can comprise one or more sensor units. One sensor unit can comprise one or more temperature sensors.

Preferably, the sensor unit has a unique identifier. The unique identifier can be a number or an alphanumeric code or a binary code or the like. The unique identifier serves for the identification of the sensor unit when it is registered.

The sensor unit has a transmitting unit. It is also conceivable that multiple sensor units share a common transmitting unit. The captured temperature values are transmitted to an external computer system via the transmitting unit. Preferably, transmission is done at least in part by wireless means. Transmission via Bluetooth, WLAN, a mobile phone network, a low-power wide-area network (LPWAN or LPN) such as, for example, a NarrowBand IoT network, via the Sigfox wireless network, by cable (e.g. via a LAN) and/or the like is conceivable.

Preferably, a location is assigned in each case to the one or more sensor units belonging to the system according to the invention. Usually, the location is the location at which the sensor unit captures temperature values. However, it can also be a location in the surrounding area of the sensor unit, or the location can have a fuzziness, for example by specification of a region on the Earth's surface in which the sensor unit is situated (e.g. in the form of a circle having a defined radius).

In a preferred embodiment, the system according to the invention has means for the determination of the location of the one or more sensor units.

It is conceivable that the sensor unit has a GPS sensor (GPS: global positioning system) or some other sensor of a global navigation satellite system (GNSS) that makes it possible to ascertain the location of the sensor unit.

An advantage of location determination by means of a global navigation satellite system is the high accuracy. The disadvantages are the relatively high component costs and the comparatively high energy demand.

It is also conceivable that location determination is done via the radio cell to which the transmitting unit of the sensor unit is connected. Such a solution usually has a lower accuracy in location determination, but means lower component costs and a lower energy demand.

In mobile communications, the simplest means of location determination is based on the cell in which a transmitting unit is situated being known. Since a switched-on mobile phone is associated with a base station, the position of the mobile phone can be assigned to at least one mobile radio cell (cell ID).

With the aid of GSM (global system for mobile communications), the location of a transmitting unit can be accurately determined to several hundred metres. In cities, the location can be accurately determined to 100 to 500 m; in rural areas, the radius increases to 10 km or more. If information about the cell ID is combined with the TA parameter (TA: timing advance), accuracy can be increased. The higher this value, the further away the transmitting unit from the base station. Using the EOTD method (EOTD: enhanced observed time difference), it is possible for a transmitting unit to be located even more accurately. In this case, the time differences of the signals between the transmitting unit and multiple receiving units are determined.

In a preferred embodiment, transmission of the temperature values and location determination are done via the Sigfox network. Sigfox is a low-power wide-area network (LPWAN) and specifically designed for small data packets and high-energy-saving operation. Sigfox base stations can communicate over long distances without being impaired by interferences. The range of an individual base station, which can manage up to a million transmitting units, is 3 to 5 km in urban areas and 30 to 70 km in rural areas. Sigfox receives the data packets from all base stations in the transmission range. This makes it possible to determine the position of a transmitting unit.

It is also conceivable that the location of a sensor unit is captured when the sensor unit is registered. For example, it is conceivable that the sensor unit is positioned at a location and an associated temperature sensor of the sensor unit is inserted into the soil at the location.

One registration step consists in the linking of sensor unit and location. It is conceivable that a user, by means of a (mobile) computer system, captures the unique identifier of the sensor unit and links said identifier to location information. The capture of the unique identifier can, for example, be done by input via an input means (e.g. a keyboard, a touchscreen, a mouse, a microphone (by speech input) or the like). Preferably, the unique identifier is present in the form of an optically readable code (e.g. a barcode or a matrix code or the like) or in the form of a wirelessly readable electronic memory (e.g. as an RFID tag) or the like. This has the advantage that the unique identifier can be read automatically and input errors (such as in the case of typing via a keyboard by a user) are avoided. The optical code can, for example, be captured using a camera, which can be a component of the (mobile) computer system. In a further step, the location is determined. It is conceivable that the means for location determination is provided by the (mobile) computer system of the user. The mobile computer system can, for example, be a smartphone which can be used to determine the location via the radio cell to which the smartphone is connected or via a GPS sensor belonging to the smartphone.

When the unique identifier is captured and the location is determined, these items of information can be linked together. As a result of the linkage, a location is assigned to the sensor unit. It is conceivable that the linked items of information are transmitted to an external computer system via a network and are stored in said computer system. It is also conceivable that the linked items of information are stored on the (mobile) computer system of the user.

Preferably, during the registration, the unique identifier of the sensor unit is additionally linked to a unique identifier of the user, with the result that an individual sensor unit (or multiple sensor units) having a defined location is assigned to the user. Preferably, the user can, as a consequence of this linkage, only capture temperature values from the sensor unit assigned to him/her or access information based on temperature values which were captured by the sensor unit assigned to him/her.

After start-up, the sensor unit captures temperature values with the aid of the temperature sensor and transmits them to an external computer system by means of the transmitting unit. In this connection, the capture of temperature values and/or the transmission of temperature values can be done regularly or irregularly. Preferably, the temperature is measured multiple times during the day (including at night), preferably once every hour. The transmission of the temperature values can be done immediately after capture of a temperature value; however, it is also conceivable that the temperature values captured within a defined period are transmitted together. Preferably, temperature values are transmitted at least once a day.

Preferably, the individual temperature values have assigned to them time points at which they were captured (measurement time points). This assignment can be done during capture or at a later time point. It can be done before or after transmission. In one embodiment of the present invention, a temperature value is captured, the particular measurement time point is determined and the captured temperature value is linked to the determined measurement time point. The linked data can then be transmitted together. In another embodiment, a temperature value is captured and transmitted. The linkage to a measurement time point is done on the external computer system. Then, for example, the arrival times of the transmitted data packets can be used as approximate values for the measurement time points. Further possibilities are conceivable.

On the external computer system, the development of nematodes is modelled on the basis of the transmitted temperature values and the associated measurement time points. Preferably, multiple models modelling different developments are implemented on the external computer system. The term "development of nematodes" is understood to mean any change over time in the quantity of nematodes in one or more nematode stages. In one embodiment, the term "development of nematodes" is understood to mean in particular the complete or partial passage through one or more life cycles.

A preferred model calculates the degree of completion of a nematode generation (modelling of the life cycle of nematodes, life cycle model for short). In a preferred embodiment, the model determines when a local maximum of the quantity of nematodes is reached in a particular nematode stage for which a control agent acts particularly efficiently (controllable nematode stage).

This may be illustrated on the basis of an example. The mould *Paecilomyces lilacinus* acts especially on nematode eggs. To efficiently control nematodes, a nematicide based on *Paecilomyces lilacinus* should therefore be applied when the quantity of nematode eggs has a local maximum. The model can therefore ascertain when said maximum is reached.

In one embodiment of the present invention, the life cycle of nematodes is modelled solely on the basis of heat sums. In addition to the captured temperature values and the measurement time points, a minimum temperature is also inserted into the calculation of such a heat sum. Development of the nematodes takes place only when the captured temperature is above the minimum temperature. For the calculation of heat sums, there are numerous methods described in the literature (see, for example, ipm.ucanr.edu/WEATHER/ddconcepts.html The minimum temperature can be determined experimentally (see, for example, A. Giné et al.: Thermal requirements and population dynamics of root-knot nematodes on cucumber and yield losses under protected cultivation, Plant Pathology (2014) 63, 1446-1453; M. López-Gomez et al.: Damage functions and thermal requirements of *Meloidogyne javanica* and *Meloidogyne incognita* on watermelon, Annals of Applied Biology ISSN 0003-4746, doi:10.1111/aab.12154; Maria Dolores Vela et al.: Thermal time requirements of root-knot nematodes on zucchini-squash and population dynamics with associated yield losses on spring and autumn cropping cycles, Eur J Plant Pathol (2014) 140:481-490, DOI 10.1007/s10658-014-0482-x).

Preferably, the model (life cycle model) is started when there is a local maximum of the quantity of nematodes in a controllable nematode stage. In a preferred embodiment, the model is started at the time point at which crop plants are planted in the soil, the temperature of which is being monitored. This is usually the time point at which a new generation of nematodes matures starting with nematode eggs.

The model can, then, be configured such that it continuously calculates the heat sum (temperature-dependent development parameter) on the basis of the transmitted temperature values and the measurement time points and compares said heat sum with a defined heat sum (defined target parameter). The defined heat sum is preferably that which is required in order to pass once through one generation of nematodes starting with a controllable nematode stage (e.g. nematode eggs). When one generation has been passed through, a local maximum of the quantity of nematodes in the controllable nematode stage is reached (again). This is a good time point for the application of a control agent which effectively controls the nematodes in the controllable nematode stage. According to the invention, a message is generated at this time point. Said message can indicate that a new generation has been passed through. It can indicate that a local maximum in the quantity of nematodes in the controllable nematode stage has been reached. It can indicate that a control agent against nematodes in the controllable nematode stage should now be applied.

For the model, it is possible to use, besides the temperature values and the associated measurement time points, further parameters, such as, for example, the nematode species, information on the soil type, on the soil moisture, on the species of the cultivated crop plant and the like. It is conceivable that the user of the computer program product according to the invention inputs such parameters into the computer program and/or that such parameters are read from a database. It is conceivable that, in such a database, such parameters have been deposited for a multiplicity of locations and/or regions. It is conceivable that one or more of the parameters are read from the database after the location of the sensor unit has been determined and linked to said sensor unit. It is conceivable that one or more of the parameters are captured by one or more further sensors (such as sensors for humidity, air pressure, electrical or thermal conductivity of the soil, movements in the soil, chemical composition of air and/or soil and/or the like).

The computer program according to the invention informs the user when the temperature-dependent development parameter has reached the defined target parameter.

In a preferred embodiment, the user of the computer program according to the invention is informed, even before the defined target parameter is reached, that the temperature-dependent development parameter is approaching the defined target parameter, meaning that the user can make preparations. For example, it is conceivable that the user is, at one or more defined values of the ratio of temperature-dependent development parameter to defined target parameter, sent one or more messages, for example when the temperature-dependent development parameter has reached 80% and/or 90% and/or 95% or some other percentage of the defined target parameter.

In a preferred embodiment, the progress of the temperature-dependent development parameter is continuously displayed for the user on a screen of the system according to the invention, for example in the form of a progress bar.

Messages about the target parameter being reached and/or other messages can be displayed for the user, for example via a screen, and/or communicated by voice message via a speaker. It is also conceivable that the user is alerted by a signal (e.g. a sound or a vibration alarm) to a new message, which is then displayed on a screen as a text message, possibly together with graphic elements. However, it is also conceivable that the user actively retrieves a message, for example by starting the computer program according to the invention.

Preferred Embodiments of the Present Invention are

1. Method for controlling nematodes in a soil, comprising the steps of: installing a temperature sensor in the soil; providing a model of the temperature-dependent development of nematodes; measuring temperature values in the soil at measurement time points; linking the temperature values to the measurement time points; calculating a development parameter on the basis of the temperature values and the measurement time points with the aid of the model; comparing the temperature-dependent development parameter with a defined target parameter; outputting a message in the event that the temperature-dependent development parameter reaches the defined target parameter.

2. Method according to embodiment 1, wherein the model of the temperature-dependent development of nematodes is a model which models the development of nematodes from one generation of a controllable nematode stage to the next generation of the controllable nematode stage.

3. Method according to either of embodiments 1 and 2, wherein the temperature-dependent development parameter is a heat sum.

4. Method according to embodiment 3, wherein the defined target parameter is a heat sum which is required so that one generation of nematodes is passed through.

5. Method according to any of embodiments 1 to 4, comprising the following steps: providing a sensor unit comprising a temperature sensor; introducing the temperature sensor into a soil; starting up the sensor unit; ascertaining the location of the sensor unit; ascertaining further location-dependent parameters such as, for example, nematode species present, information on the soil type, on the soil moisture, on the species of the cultivated crop plant; modelling the development of nematodes on the basis of the temperature values, the measurement time points and one or more of the further location-dependent parameters.

6. Method according to any of embodiments 1 to 5, comprising the following steps: providing a sensor unit comprising a temperature sensor; introducing the temperature sensor into a soil; starting up the sensor unit; ascertaining the location of the sensor unit; ascertaining a unique identifier of the sensor unit; linking the location of the sensor unit to the unique identifier; ascertaining user data; linking the user data to the unique identifier of the sensor unit; displaying the location of the sensor unit on a screen of the user.

7. Method according to any of embodiments 1 to 6, comprising the following steps: providing a sensor unit comprising a temperature sensor; introducing the temperature sensor into a soil; starting up the sensor unit; ascertaining a unique identifier of the sensor unit; ascertaining user data; linking the user data to the unique identifier of the sensor unit; displaying the location of the sensor unit and/or displaying temperature values which are captured using the sensor unit and/or displaying a result of the modelling of the development of nematodes, which result is based on the temperature values which are captured using the sensor unit, on a screen of the user.

8. Method according to any of embodiments 1 to 7, comprising the step of: applying a control agent against a controllable nematode stage, preferably a nematicide based on the mould *Paecilomyces lilacinus* against nematode eggs.

9. System comprising a sensor unit having a temperature sensor and a transmitting unit, and a computer system having a receiving unit; wherein the sensor unit is configured to capture temperature values using the temperature sensor at measurement time points; wherein the sensor unit is configured to send the temperature values using the transmitting unit; wherein the computer system is configured to receive the temperature values using the receiving unit; wherein the computer system is configured to calculate a temperature-dependent development parameter on the basis of the received temperature values and the measurement time points with the aid of a model of the temperature-dependent development of nematodes and to compare said development parameter with a defined target parameter; wherein the computer system is configured to generate a message when the temperature-dependent development parameter reaches the defined target parameter.

10. System according to embodiment 9, comprising a first computer system, and a second computer system; wherein the first computer system is configured to receive temperature values and measurement time points, to calculate a temperature-dependent development parameter, to compare the calculated temperature-dependent development parameter with a defined target parameter and to then transmit a message to the second computer system when the temperature-dependent development parameter reaches the defined target parameter; wherein the second computer system is configured to receive the message and to display it to a user.

11. System according to either of embodiments 9 and 10, comprising means for linking the sensor unit to a user; wherein the computer system is configured to display to the user only that information which is based on temperature values which are captured using the sensor unit linked to the user.

12. System according to any of embodiments 9 to 11, comprising means for determining the location of the sensor unit; a unique identifier, by means of which it is possible to identify the sensor unit; means for linking the location of the sensor unit to the unique identifier.

13. Computer program product comprising a program code which is stored on a data carrier and which causes a computer system comprising a main memory to execute the following steps when the program code is loaded into the main memory: receiving temperature values which have been captured at measurement time points; calculating a temperature-dependent development parameter on the basis of the received temperature values and the measurement time points with the aid of a model of the temperature-dependent development of nematodes; comparing the calculated temperature-dependent development parameter with a defined target parameter; generating a message when the temperature-dependent development parameter reaches the defined target parameter.

The invention will be more particularly elucidated below on the basis of figures and examples, without there being any intention to restrict the invention to the features and combinations of features in the figures and examples.

FIG. 1 shows schematically one embodiment of the system according to the invention. The system comprises a sensor unit (10) and a computer system (20).

The sensor unit (10) comprises a control unit (11) for controlling the sensor unit (10). The control unit (11) controls, for example, the capture of measurement values, the linkage of the measurement values to the measurement time points and the transmission of data.

The sensor unit (10) comprises a timer (13) which makes it possible to ascertain the current time (date, time).

The sensor unit (10) comprises a temperature sensor (15) which makes it possible for the sensor unit (10) to measure temperatures at measurement time points. The control unit (11) links the measured temperature values to the associated measurement time points. The sensor unit (10) further comprises a transmitting unit (12) which makes it possible to transmit the measured temperatures and the associated measurement time points to the computer system (20).

The computer system (20) comprises a control and processing unit (21) for controlling the computer system (20) and for carrying out calculations. The computer system (20) comprises a receiving unit (22) which makes it possible to receive temperature values and the associated measurement time points that are transmitted by the transmitting unit (12). The computer system (20) has a permanent memory (23) in which data such as, for example, one or more defined target parameters and one or more models relating to the development of nematodes are stored. A component of the control and processing unit (21) is a main memory (24) into which it is possible to load data and models from the permanent memory (23) as well as the transmitted temperature values and measurement time points. On the basis of the data and the transmitted values, the control unit calculates a temperature-dependent development parameter with reference to a model and compares said development parameter with a target parameter. When the development parameter reaches the target parameter, the control and processing unit (21) generates a message. Said message can be outputted to a user via an output unit (26). The output unit (26) has, to this end, one or more output means, such as, for example, a screen, a printer, a permanent memory, a speaker, a connection to a further computer system and/or the like.

A further component of the computer system (20) is an input unit (25) via which a user can input data and commands. The input unit (25) has one or more input means, such as, for example, a mouse, a touchscreen, a keyboard, a microphone and/or the like. The output unit (25) and the input unit (26) serve for the communication of the computer system (20) with a user.

Figure 2:
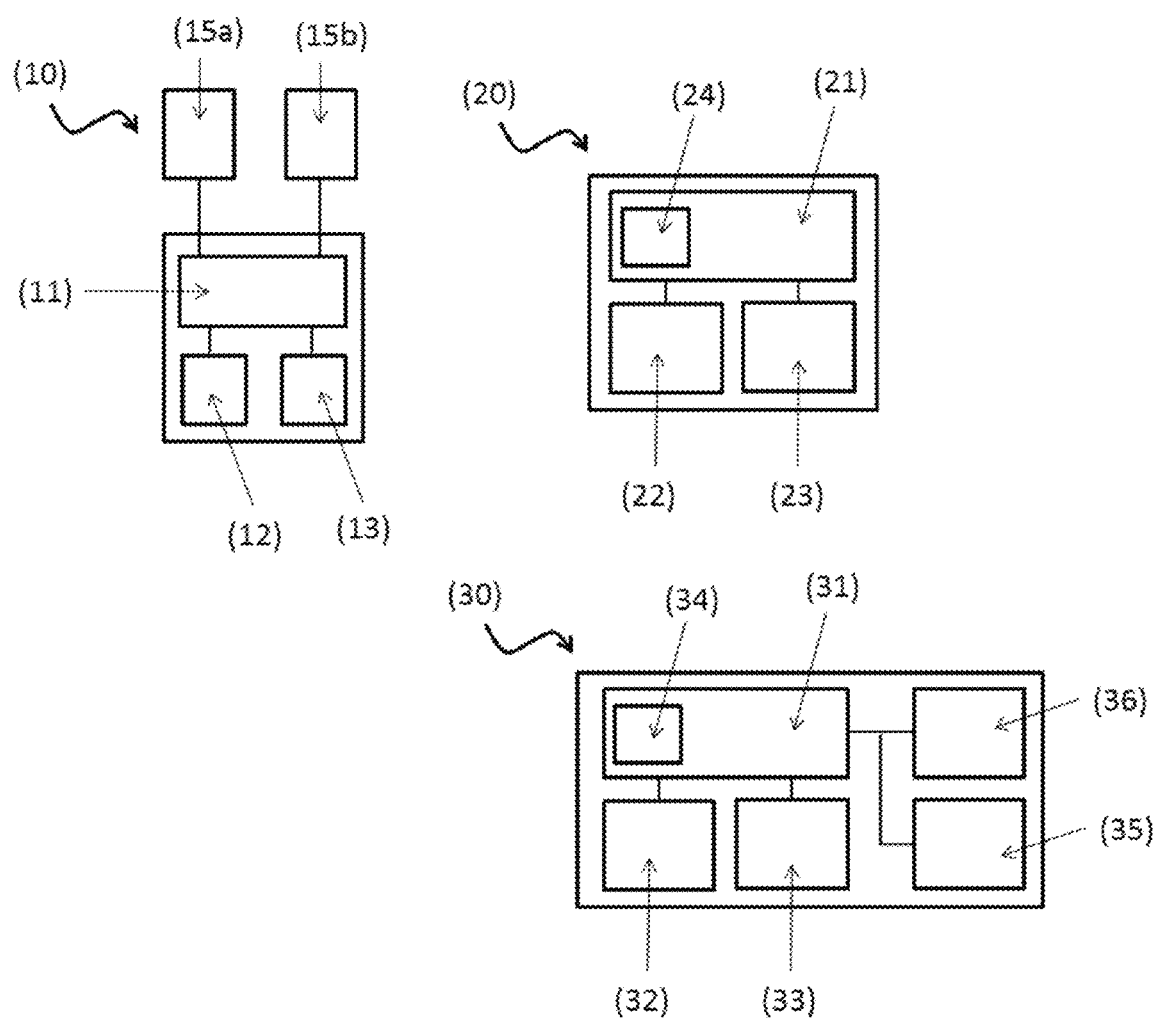

FIG. 2 shows schematically a further embodiment of the system according to the invention. The system comprises a sensor unit (10), a first computer system (20) and a second computer system (30).

The sensor unit (10) comprises two temperature sensors (15a, 15b) which can measure the temperatures at different points in the soil. For example, it is conceivable that one temperature sensor is installed outdoors and the other in a greenhouse. The use of more than one temperature sensor has the advantage that it is possible to monitor for different points the individual development in temperature throughout the day and that it is thus possible to individually model the development of nematodes for different points.

The sensor unit (10) in FIG. 2 further comprises, like the sensor unit in FIG. 1 previously, a control unit (11), a transmitting unit (12) and a timer (13).

The first computer system (20) serves for the modelling of the development of the nematodes; it is preferably realized as a stationary computer system (server). The second computer system (30) serves for the communication with a user (client). It can be realized as a stationary and/or mobile computer system (30).

The first computer system (20) receives the temperature values transmitted from the transmitting unit (12) and the associated measurement time points with the aid of a receiving unit (22). Loaded into a main memory (24) of the control and processing unit (21) is a model which models the development of nematodes. The computer system (20) is configured such that it calculates a temperature-development development parameter on the basis of the received values and compares said development parameter with a defined target parameter. The computer system (20) is further configured such that it generates a message when the temperature-development development parameter reaches the defined target parameter. The computer system (20) is further configured such that it transmits the message to the second computer system (30) via a transmitting unit.

The second computer system (30) receives the message with the aid of the receiving unit (32). Via the output unit (36), the message can be outputted to a user, for example by means of a display on a screen. The second computer system

(30) further has an input unit (35), a control and processing unit (31) comprising a main memory (34), and a permanent memory (33).

Figure 3:
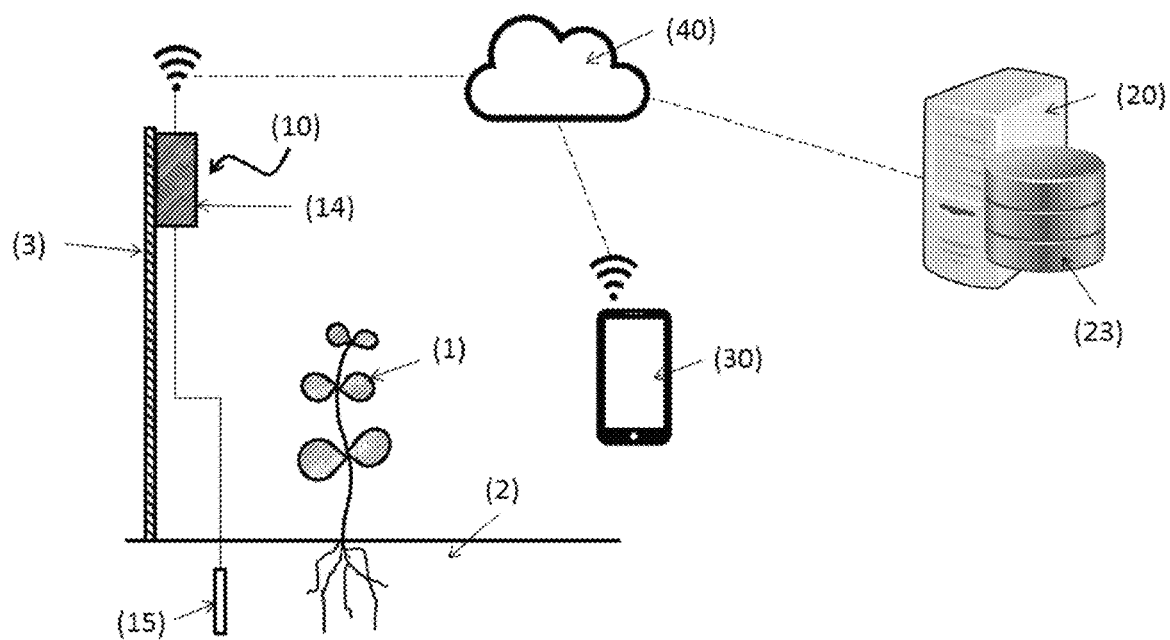

FIG. 3 shows a further embodiment of the system according to the invention. The system comprises a sensor unit (10) having a temperature sensor (15) which is introduced into a soil (2). Planted in the soil are crop plants (1) which can be attacked by nematodes. The sensor unit (10) has a housing (14) with control panel. Introduced into the housing (14) are a transmitting unit and a control unit (not shown). The housing (14) is mounted on a mounting unit (3). The housing (14) with control panel is mounted so as to be elevated with respect to the soil (2), with the result that a user can operate the instrument relatively easily. It is conceivable to mount a canopy in order to protect the housing from rainfall and/or from direct solar radiation. The system further comprises an external computer system (20) which is realized as a server. The external computer system (20) is connected to a database (23). The system further comprises a second computer system (30) which is realized as a smartphone. The sensor unit (10), the first computer system (20) and the second computer system (30) are connected to one another via a network (40). Via the network (40), temperature values and measurement time points are transmitted from the sensor unit to the first computer system (30). There, an analysis of the values and a modelling of the development of the nematodes take place. The results of the analysis and modelling are transmitted to the second computer system (30) via the network (40). It is also conceivable that the sensor unit (10) and the first computer system (30) are connected to one another via a first network, whereas the second computer system (30) and the first computer system (20) communicate with one another via a different, second network.

Figure 4:
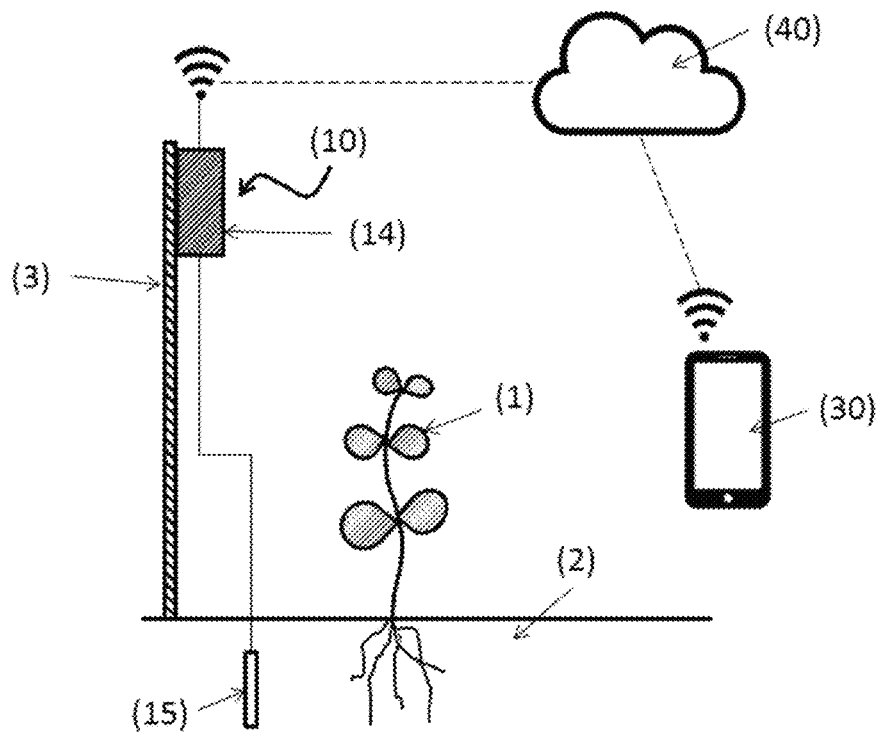

FIG. 4 shows a further embodiment of the system according to the invention. In contrast to the embodiment shown in FIG. 3, the system shown in FIG. 4 has only one computer system (30), which is realized as a smartphone (but which can also be realized as a table computer, desktop computer, smartwatch or the like). The computer system (30) receives the values captured and transmitted by the sensor unit (10), models the development of the nematodes and displays the result of the modelling preferably on a screen.

Figure 5:
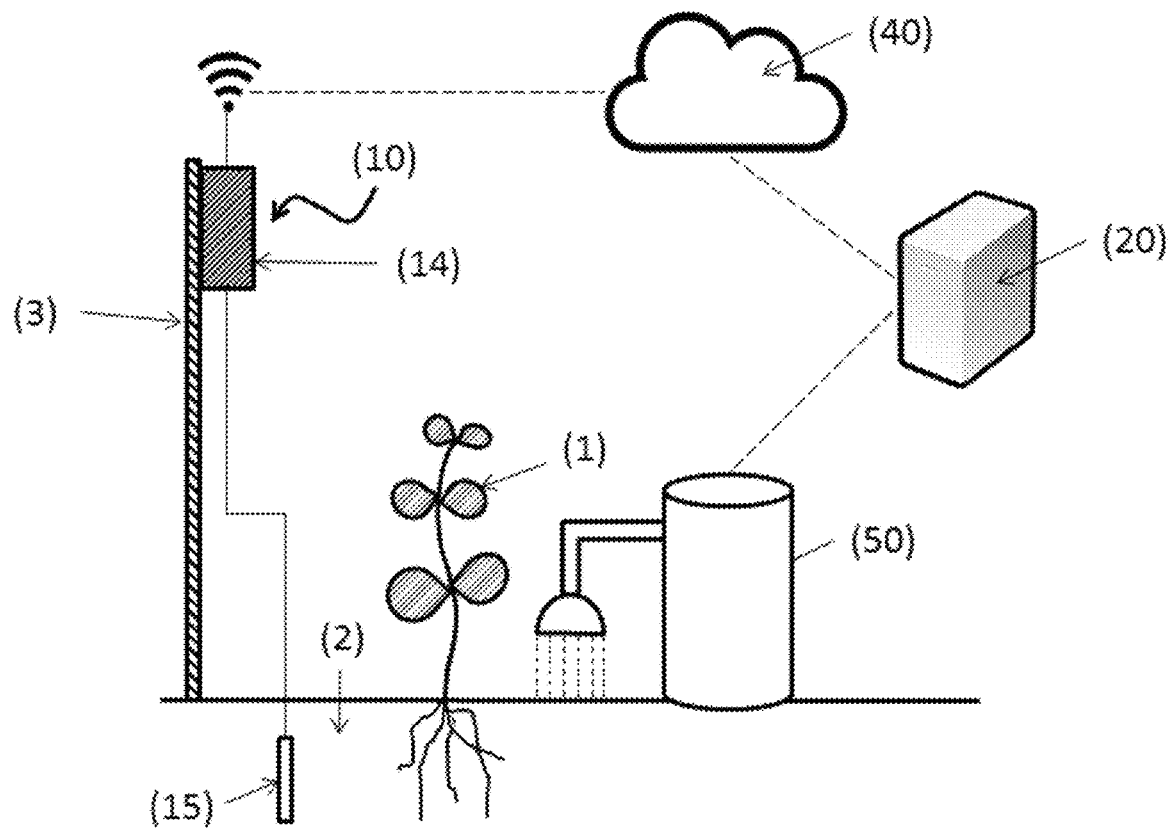

FIG. 5 shows a further embodiment of the system according to the invention. The system comprises a sensor unit (10), a computer system (20) and an application system (50). Temperature values and measurement time points are transmitted from the sensor unit (10) to the computer system (20) via a network (40). On the basis of the transmitted values, the computer system (20) models the development of the nematodes; more particularly, the computer system (20) calculates a temperature-dependent development parameter and compares it with a defined target parameter. When the development parameter reaches the target parameter, the computer system (20) generates a message and sends it to the application system (50). The application system (50) applies a control agent for controlling the nematodes.

Figure 6:
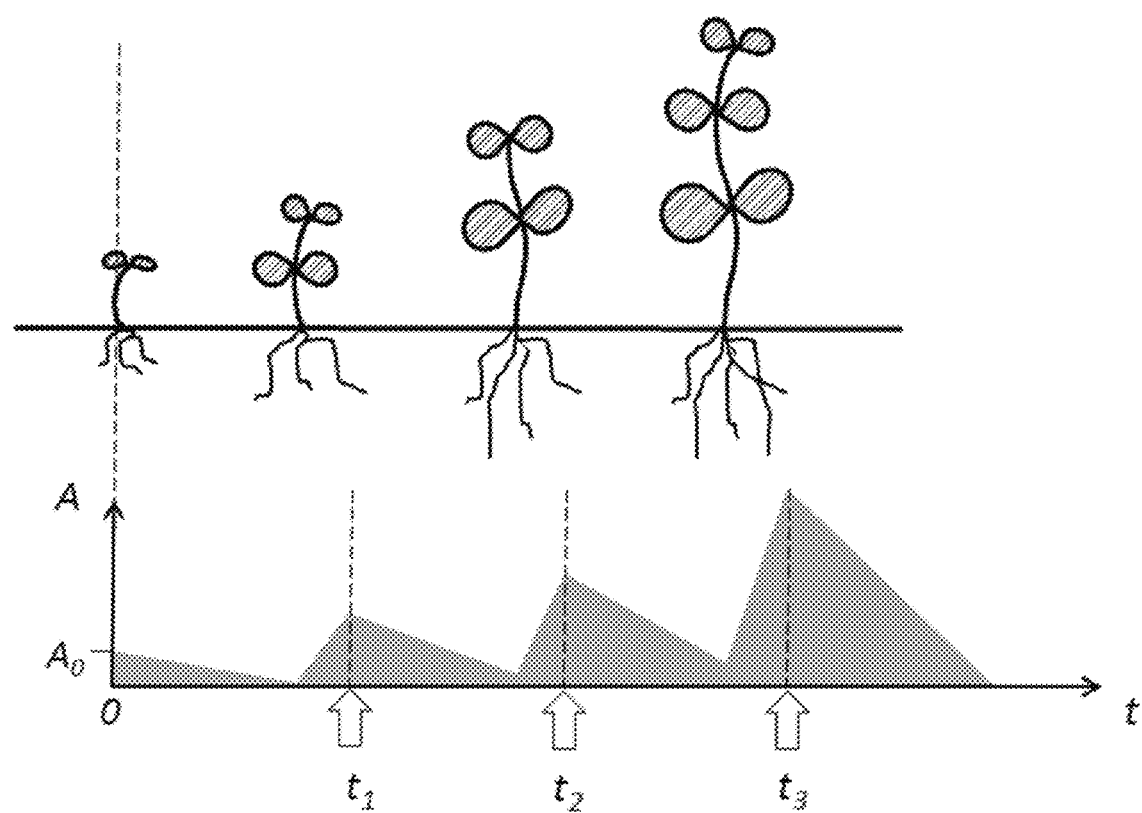

FIG. 6 shows schematically the development of nematodes using the example of the quantity (A) of nematode eggs as a function of time (t). In the present example, the development starts at time point t=0, after crop plants have been planted into the soil ("activation"). At time point t=0, there is a quantity $A_0$ of nematode eggs. The quantity of nematode eggs initially decreases over time, since larvae are hatching. The nematodes pass through a series of stages until a nematode stage is reached which lays new nematode eggs: the quantity of nematode eggs increases. At time point $t=t_1$, a local maximum in the quantity of nematodes in the stage of nematode eggs is reached. One generation is passed through in the time between t=0 and $t=t_1$. Thereafter, the quantity of nematode eggs decreases again.

At time points $t=t_2$ and $t=t_3$, local maxima in the quantity of nematode eggs are achieved again. In the time between $t=t_1$ and $t=t_2$, a further generation is passed through; in the time between $t=t_2$ and $t=t_3$, a further generation is likewise passed through. Time points $t=t_1$, $t=t_2$ and $t=t_3$ are time points at which a control agent which acts against nematode eggs (e.g. a nematicide based on the mould *Paecilomyces lilacinus*) is preferably applied.

Figure 7:
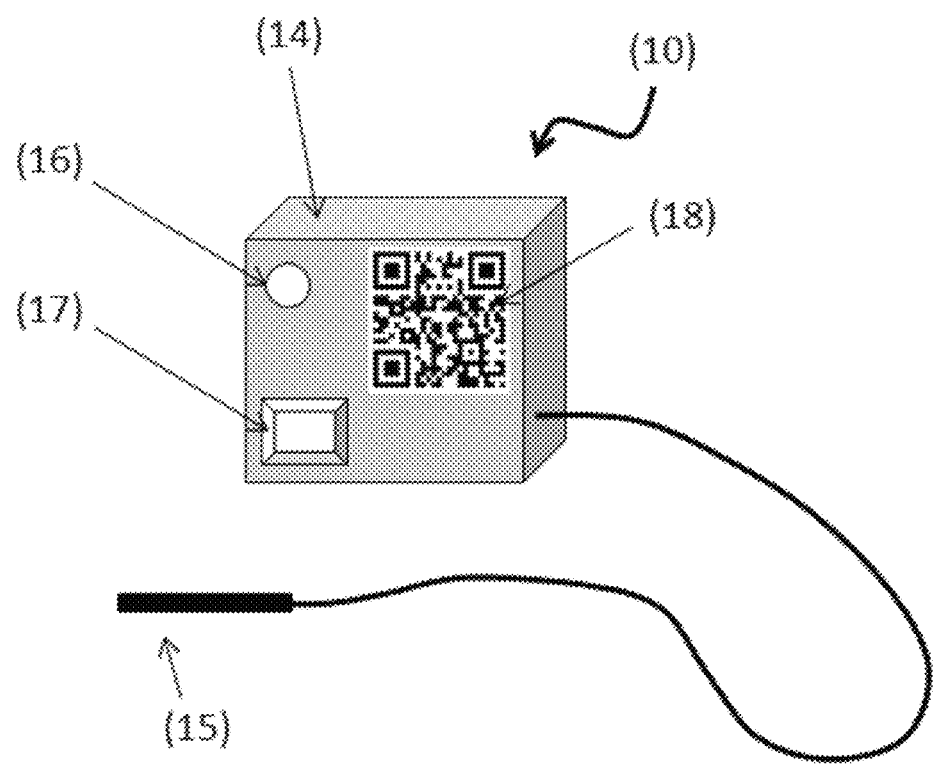

FIG. 7 shows schematically one embodiment of a sensor unit (10). The sensor unit (10) has a housing (14) into which a transmitting unit and a control unit are introduced (not shown). The sensor unit (10) comprises a temperature sensor (15) which is connected to the control unit via a cable connection. A switch (17) is used to switch on and switch off the sensor unit (10). A signal light (16) can display the status of the sensor unit (10). Situated on the housing (14) is an optically readable code (18) having a unique identifier.

Figure 8:
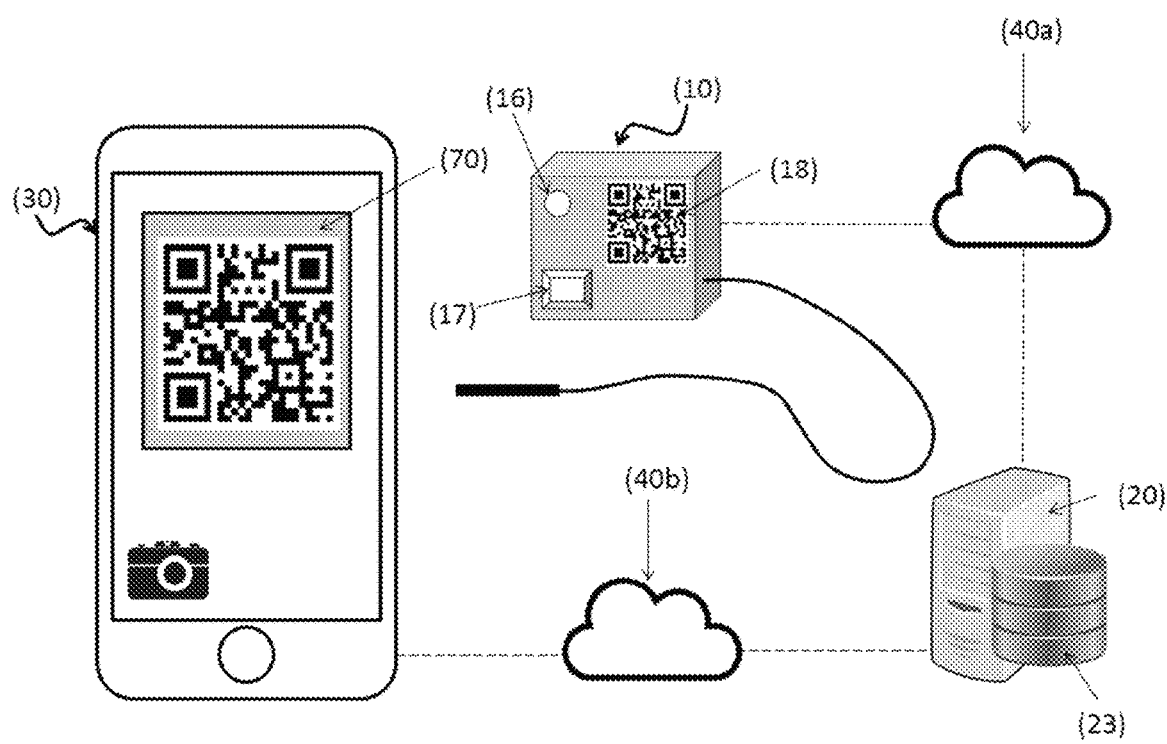

FIG. 8 shows schematically a registration procedure for registering a new sensor unit. By pressing the on/off switch (17), the sensor unit (10) is started up. It connects automatically to a server (20) via a network (40a) and transmits a unique identifier, by means of which the sensor unit (10) can be unambiguously identified. Furthermore, the location of the sensor unit (10) is ascertained in an automatic manner, for example via a GPS sensor, which can be a component of the sensor unit (10), or via the radio cell in which the sensor unit (10) is situated. The location of the sensor unit (10) is transmitted to the server (20), too. Unique identifier and location are stored together in a database (23). The signal light (16) indicates that the sensor unit (10) has been started up and location and unique identifier have been transmitted. From then on, the sensor unit captures temperature values and transmits them together with the associated measurement time points to the server (20).

In a further step, the sensor unit is linked to a user. In the present case, the linkage to the user is done by means of a second computer system (30) which is realized as a smartphone. The user starts the computer program according to the invention. Said user is prompted to record the optically readable code (18) with the aid of the camera belonging to the smartphone; the screen of the smartphone displays a live image. The user holds the camera in front of the optical code and generates a recorded image (70) of the code. It is also conceivable that the recorded image is generated automatically once the smartphone has recognized that an optically readable code is represented on the sensor chip of the camera. The recorded image (70) is analysed and the optically readable code is interpreted. Said code comprises the unique identifier. The smartphone sends the unique identifier together with user data to the server (20) via a network (40b). The server stores the sent information in the database (23) in relation to the data already stored for the sensor unit (10). A location and a user are now assigned to the sensor unit.

Figure 9:
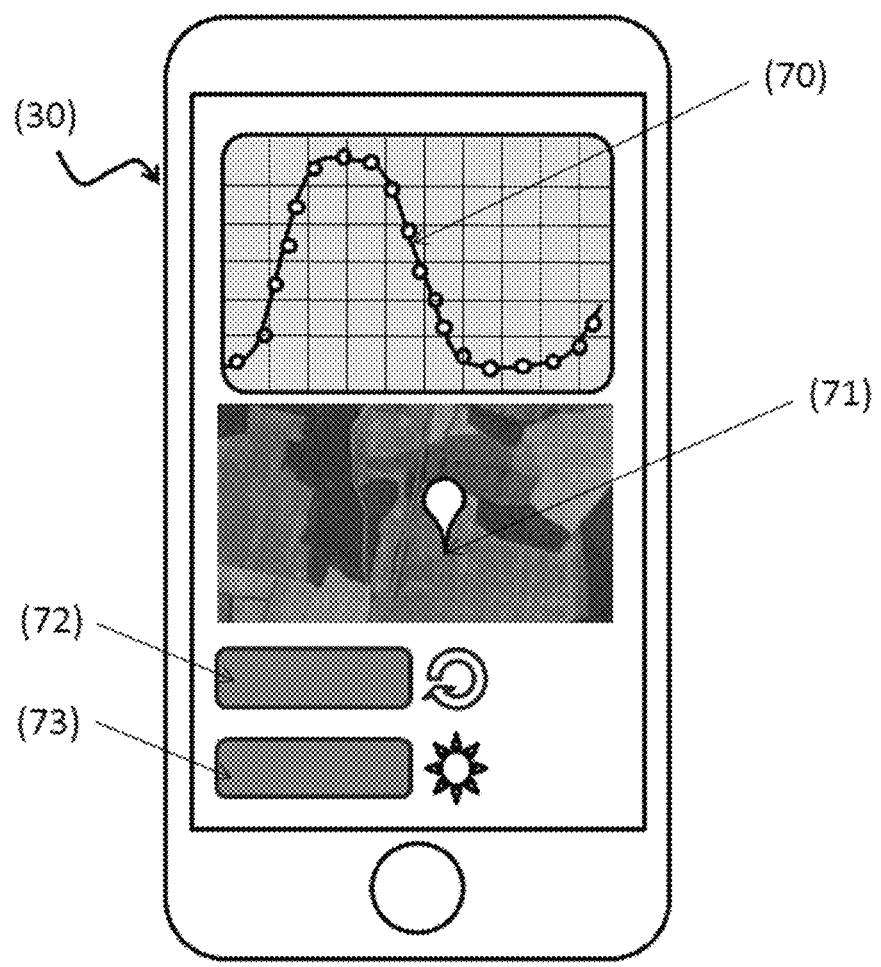

FIG. 9 shows by way of example a screen display of the second computer system (30) realized as a smartphone and in operation after registration. In the middle area, an overview map of the environment in which the sensor unit is situated is displayed. A label (71) indicates the location of the sensor unit. In the upper area, the temperature (70) which is measured using the sensor unit is displayed as a function of time. In the present example, the individual temperature values, which have been captured at individual measurement time points, are displayed as small circles; a spline function connects the points to one another. In the lower area, two virtual buttons, by means of which various models of the development of nematodes can be started, are displayed. The upper button starts a model for the modelling of the life cycles of the nematodes; the lower button starts a model for the thermal control of nematodes. The first model (life cycle model) is preferably started when crop plants have been planted in the soil. The second model (control model) is preferably started when the thermal treatment is started (e.g. application of solarization plastic films). The second model (control model) is described in more detail in EP18171591.3, the content of which is included in this description in its entirety by way of reference.

Figure 10:
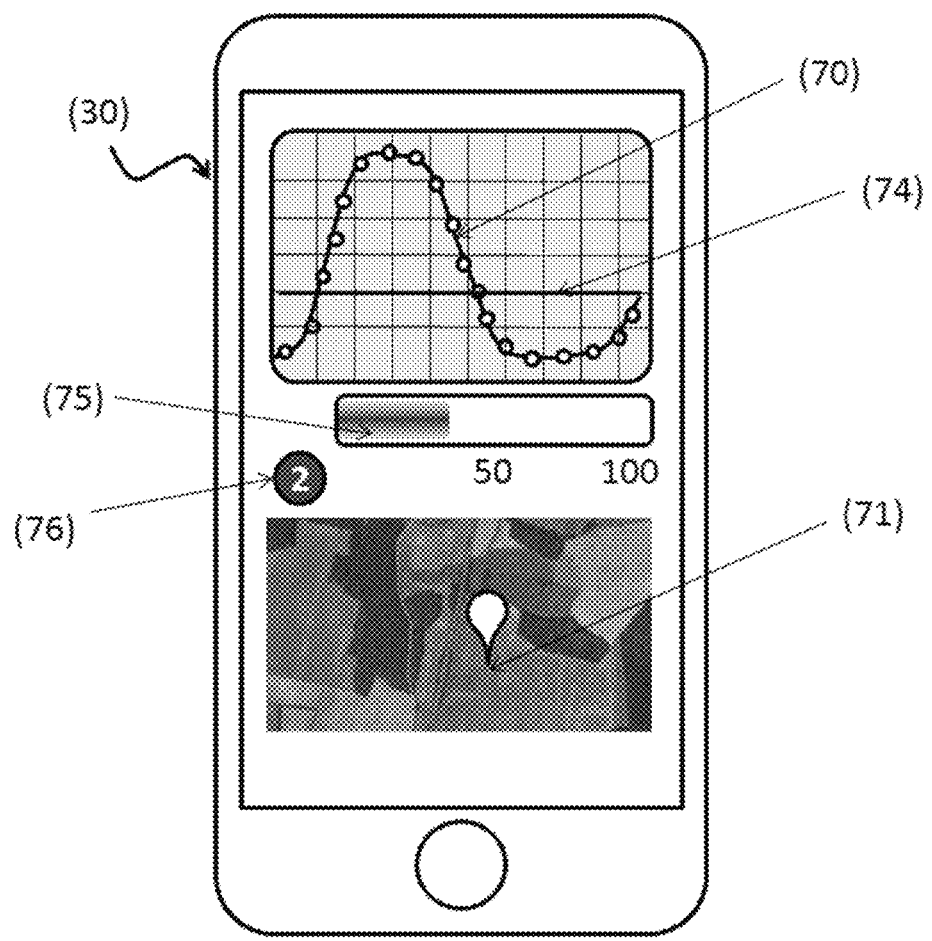

FIG. 10 shows by way of example a screen display of the second computer system (30) realized as a smartphone and in operation after registration and of the pressing of one of the virtual buttons from FIG. 9. As already depicted in FIG. 9, an overview map of the environment of the sensor unit with a label (71) of the location of the sensor unit is displayed. The temperature (70) measured by the sensor unit, as a function of time, is again displayed. Additionally displayed is the minimum temperature (74) which must be reached so that (a) nematode development takes place (in the case of the life cycle model) or (b) nematodes are thermally controlled successfully (in the case of the control model). A progress bar (75) indicates at which percentage the temperature-dependent development parameter has already reached the defined target parameter (in the present example, about 30%). It is conceivable that the colour of the progress bar changes when the bar is approaching the value of 100%. For example, it is conceivable that the bar is green so long as it is situated within the range of 5% to 80%. From 81%, it can have a yellow colour, from 91% an orange colour and from 95% a red colour. Other values and other colours for the colour transitions are conceivable.

If the ongoing model is a life cycle model, the number (76) of generations already passed through is preferably displayed.

When the 100% mark is reached; a local maximum of the quantity of nematodes in a controllable nematode stage (e.g. nematode eggs) is reached and a control agent against the relevant nematode stage can be applied.

What is claimed is:

1. A method for controlling nematodes in soil, the method comprising:
   (A) installing a temperature sensor within the soil;
   (B) providing a model of temperature-dependent development of nematodes, wherein the model models complete or partial passage through one or more life cycles of the nematodes;
   (C) measuring, via the temperature sensor, temperature values in the soil at measurement time points;
   (D) linking the temperature values to the measurement time points;
   (E) calculating, using the model of temperature-dependent development of nematodes, a heat sum based on the measured temperature values and the measurement time points;
   (F) comparing the calculated heat sum with a target parameter, wherein the target parameter specifies a heat sum which is necessary to reach a local maximum in a quantity of nematodes in a controllable nematode stage;
   (G) in response to the calculated heat sum reaching the target parameter, generating a message indicating application of a nematode control agent to the soil and transmitting the message to a control agent application system, wherein a content of the message is that a local maximum in the quantity of nematodes that are in the controllable nematode stage has been reached; and
   (H) in response to the message, automatically applying, by the control agent application system, the nematode control agent to the soil against nematodes in the controllable nematode stage.

2. The method of claim 1, wherein providing the model of temperature-dependent development of nematodes includes selecting the model from multiple different models and starting the model when crop plants have been planted in the soil; and
   wherein the heat sum specified by the target parameter is further that heat sum which is necessary to pass through one generation of nematodes starting with nematode eggs.

3. The method of claim 1, further comprising:
   (I) repeating steps (C) to (G) during a current vegetation period of a crop planted in the soil.

4. The method of claim 1, wherein step (A) includes:
   providing a sensor unit comprising the temperature sensor;
   introducing the temperature sensor into the soil, thereby installing the temperature sensor within the soil;
   starting the sensor unit;
   ascertaining a location of the sensor unit;
   ascertaining a unique identifier of the sensor unit;
   linking the location of the sensor unit to the unique identifier;
   ascertaining user data;
   linking the user data to the unique identifier of the sensor unit;
   displaying the location of the sensor unit on a screen of a computer system of the user.

5. The method of claim 4, wherein step (G) includes:
   displaying, on the screen of the computer system of the user, the location of the sensor unit and/or temperature values which are captured using the sensor unit and/or a result of the modelling of the development of nematodes.

6. The method of claim 4, wherein step (G) includes displaying, on the screen of the computer system of the user, the result of the modelling of the development of nematodes, wherein the result is based on the temperature values which are captured using the sensor unit.

7. The method of claim 3, wherein the controllable nematode stage includes nematode eggs, and wherein the control agent includes a nematicide based on the mold *Paecilomyces lilacinus*; and
   wherein applying the control agent against nematodes in the controllable nematode stage includes applying the nematicide against the nematode eggs.

8. A system for controlling nematodes in soil, the system comprising:
   a sensor unit having a temperature sensor configured to be installed within the soil, and a transmitting unit;
   a computer system having a memory and a receiving unit, the memory including a model configured to model complete or partial passage through one or more life cycles of the nematodes; and
   a control agent application system;
   wherein the sensor unit is configured to:
     capture temperature values for the soil using the temperature sensor at measurement time points;
     link the temperature values to the measurement time points; and send the temperature values and the measurement time points to the computer system, using the transmitting unit;

wherein the computer system is configured to:
receive the temperature values and the measurement time points, from the sensor unit, using the receiving unit;
calculate, using the model, a heat sum based on the received temperature values and the measurement time points, and compare said calculated heat sum with a target parameter, wherein the target parameter is a heat sum which is necessary to reach a local maximum in a quantity of nematodes that are in a controllable nematode stage; and
in response to the calculated heat sum reaching the target parameter, generate a message indicating application of a control agent to the soil and transmit the message to the control agent application system, wherein a content of the message is that a local maximum in the quantity of nematodes that are in the controllable nematode stage has been reached; and wherein, in response to the message, the control agent application system is configured to automatically apply the control agent to the soil against nematodes in the controllable nematode stage.

9. The system of claim 8, wherein the controllable nematode stage is nematode eggs.

10. The system of claim 8, wherein the computer system includes a first computer system and a second computer system;
wherein the first computer system is configured to:
receive the temperature values and the measurement time points from the sensor unit;
calculate the heat sum;
compare the calculated heat sum with the target parameter; and
generate and transmit the message to the control agent application system;
wherein the first computer system is further configured to transmit the message to the second computer system; and
wherein the second computer system is configured to receive the message and to display the message, via an interface, to a user, and wherein the interface further includes a location of the sensor unit and the temperature values which are captured using the sensor unit.

11. The system of claim 8, further comprising means for linking the sensor unit to a user;
wherein the computer system is configured to display to the user only that information which is based on temperature values which are captured using the sensor unit linked to the user.

12. The system of claim 8, further comprising:
means for determining a location of the sensor unit, wherein the sensor unit is associated with a unique identifier that identifies the sensor unit;
means for linking the location of the sensor unit to the unique identifier.

13. A non-transitory computer-readable storage medium comprising program code for controlling nematodes in soil, which when executed by at least one processor, causes the at least one processor to perform the following steps:
receiving temperature values for the soil from a temperature sensor installed in the soil, wherein the temperature values have been captured at measurement time points;
linking the temperature values to the measurement time points;
calculating a temperature-dependent development parameter based on the received temperature values and the measurement time points, via a model of temperature-dependent development of nematodes;
wherein the model models complete or partial passage through one or more life cycles of the nematodes; and
wherein the temperature-dependent development parameter is a heat sum;
comparing the calculated temperature-dependent development parameter with a defined target parameter;
wherein the defined target parameter is a heat sum which is necessary to reach a local maximum in a quantity of nematodes that are in a controllable nematode stage;
in response to the calculated heat sum reaching the target parameter, generating a message indicating application of a nematode control agent to the soil, wherein a content of the message is that a local maximum in the quantity of nematodes that are in the controllable nematode stage has been reached;
outputting the message to a control agent application system; and
causing the control agent application system, based on the message, to apply the control agent to the soil against nematodes in the controllable nematode stage.

14. The non-transitory computer-readable storage medium of claim 13, wherein the program code of the non-transitory computer-readable storage medium, when executed by the at least one processor, further causes the at least one processor to perform the following steps:
providing the model of temperature-dependent development of nematodes;
measuring, via the temperature sensor, the temperature values at the measurement time points; and
linking the temperature values to the measurement time points.

15. The non-transitory computer-readable storage medium of claim 14, wherein the program code of the non-transitory computer-readable storage medium, when executed by the at least one processor, further causes the at least one processor to perform the following step:
selecting the model from multiple available models stored in memory in communication with the at least one processor; and
starting the model when crop plants have been planted in soil;
wherein the controllable nematode stage includes nematode eggs, and wherein the heat sum of the target parameter is that heat sum which is necessary to pass through one generation of nematodes starting with the nematode eggs.

16. The non-transitory computer-readable storage medium of claim 14, wherein the program code of the non-transitory computer-readable storage medium, when executed by the at least one processor, further causes the at least one processor to perform the following steps:
ascertaining a location of the temperature sensor;
ascertaining a unique identifier of the temperature sensor;
linking the location of the temperature sensor to the unique identifier;
ascertaining user data;
linking the user data to the unique identifier of the temperature sensor; and displaying the location of the temperature sensor on a screen of the user.

17. A kit for use in controlling nematodes in soil, the kit comprising:
the non-transitory computer-readable storage medium of claim 12; and
the control agent to be applied against the nematodes in the controllable nematode stage, wherein the control agent includes a nematicide based on the mold *Paecilomyces lilacinus*, and wherein the nematode stage includes nematode eggs.

18. The kit of claim 17, further comprising the sensor unit, wherein the sensor unit includes:
the temperature sensor operable to measure the temperature values; and
a transmitting unit operable to transmit the measured temperature values to the at least one processor.

* * * * *